April 24, 1951 W. G. CROSS 2,550,332
PEANUT AND LEAFY VEGETABLE HARVESTER
Filed Jan. 12, 1948 3 Sheets-Sheet 1
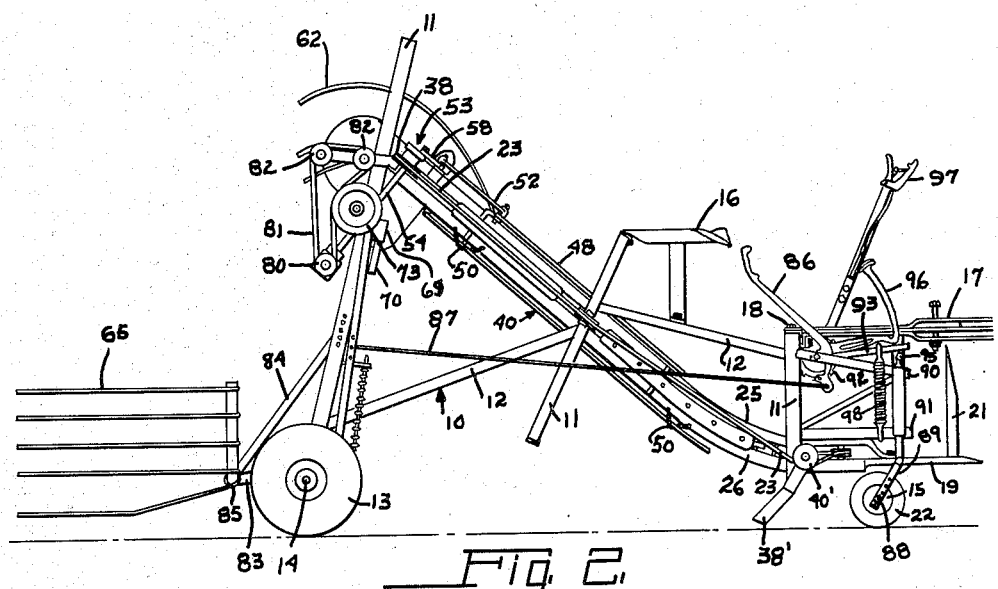
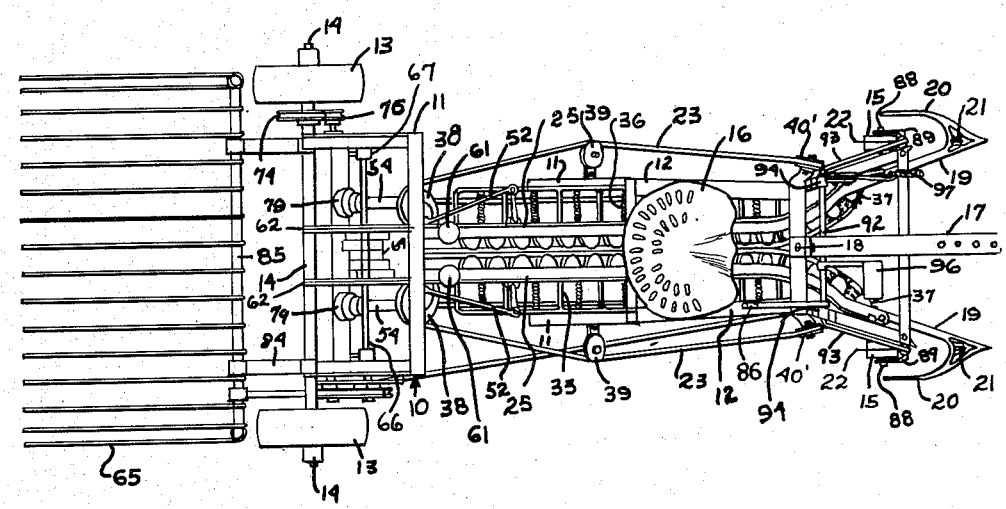
INVENTOR.
WILLIAM G. CROSS
BY
Semmes, Keegin, Robinson & Semmes
ATTORNEYS

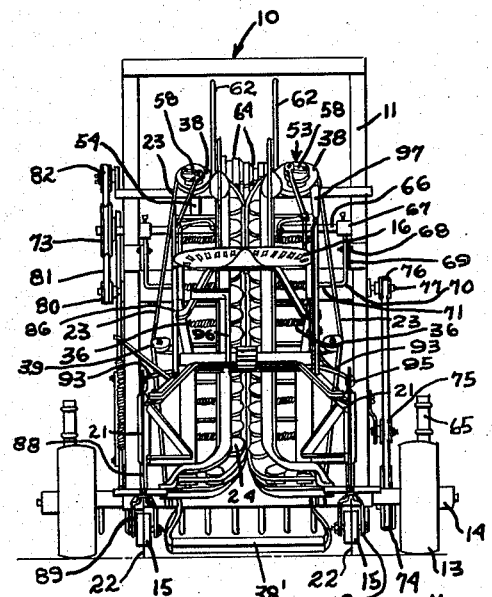

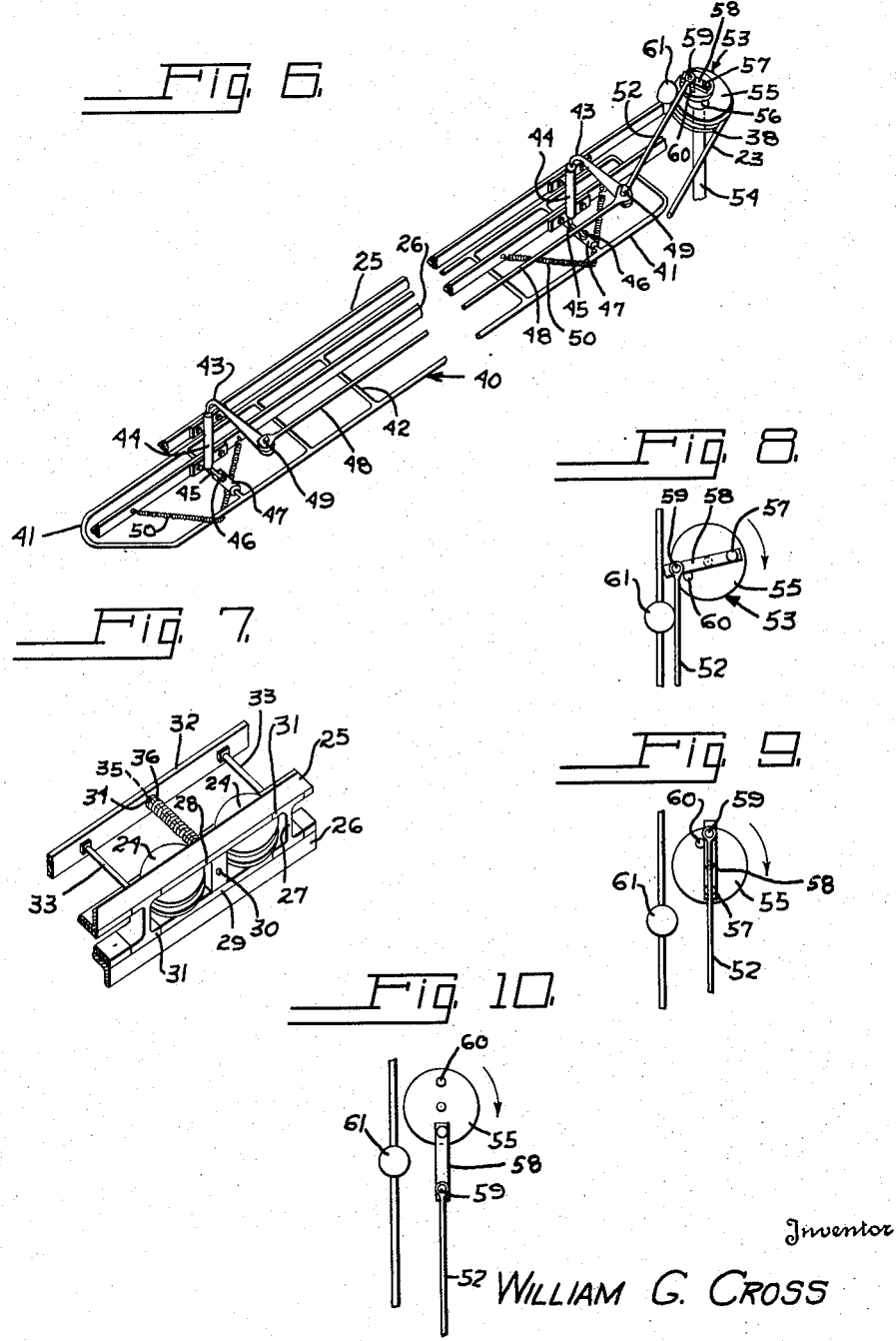

Patented Apr. 24, 1951

2,550,332

UNITED STATES PATENT OFFICE 2,550,332

PEANUT AND LEAFY VEGETABLE HARVESTER

William Green Cross, Cordele, Ga., assignor of forty-nine per cent to Benjamin Zeesman, Cordele, Ga.

Application January 12, 1948, Serial No. 1,838

5 Claims. (Cl. 55—108)

The present invention relates to agricultural harvesting machinery, and has particular reference to apparatus for harvesting vegetables of the leafy type as well as plants characterized by underground root or seed growth, such as the peanut plant.

An object of the invention is to provide apparatus for harvesting plants of the type characterized by subsurface growth of an edible root or seed attached to a vine, cleansing and assembling the plants for subsequent harvesting treatment.

A further object is to provide a harvester for processing peanut and other plants such as for example, beet, carrot and turnip plants.

A further object is to provide a harvester for processing crops of the type specified which is of simple and durable construction, inexpensively operated, and which embodies a minimum of parts, adjustment, repair, and replacement in use.

A further object is to provide a harvesting machine which draws plants to be harvested from the ground, removes extraneous vines, weeds and associated waste, such as trailing roots, frees the plants from soil clinging thereto, and assembles the cleansed plants for further harvesting treatment.

A further object is to provide a novel shaker mechanism for use with a harvesting machine for effecting the separation of soil normally clinging to the plants upon removal from the ground, with a minimum of damage to the crop.

A further object is to provide a peanut harvesting machine which cleanly removes the plants from the ground without wrenching or tearing of the plant roots such as would cause premature separation of the peanuts from the plant, lending to excessive waste.

Yet a further object is to provide a peanut harvesting machine which may be moved easily over successive rows of peanut plants for harvesting purposes and which may be adjusted in use to compensate for such variable factors as soil hardness, depth of the peanuts below the surface of the soil, the type of peanut being harvested, and the like.

A further object is to provide a harvesting apparatus provided with means for separating plant roots having soil fertilizer values from the vegetables as they are removed from the ground.

Yet a further object of the invention is to provide a novel means for operating the shaker mechanism of the invention for purposes of separating encrusted earth from the plants.

Other objects and advantages of the invention will be apparent from the following detailed description thereof taken in connection with the drawings, wherein:

Figure 1 is a side elevation of the apparatus of the invention;

Figure 2 is a plan view thereof;

Figure 3 is a front end elevation of the apparatus of the invention;

Figure 4 is a rear elevation view thereof;

Figure 5 is a view in vertical elevation taken along the lines 5—5 of Figure 4;

Figure 6 is a detailed perspective view of the shaker mechanism employed in carrying out the invention;

Figure 7 is a detailed perspective view of the roller mechanism mounting employed in connection with the vine carrying belts;

Figure 8 is a detailed plan view of the cam mechanism employed to operate the shaker bars of the invention; and Figures 9 and 10 are plan views showing the sequence of operation of the device shown in Figure 8.

In its broadest definition, the present invention embodies a harvesting apparatus which may be self powered or powered by auxiliary power means for movement over successive rows of plants to draw the plants from the ground, free from trailing roots, excess vines and other extraneous matter. Means are provided for cutting the plants free from roots having fertilizer values and normally passing to waste, simultaneously cutting off surface vines extending laterally from the main portion of the plant. When the plant is freed from the ground, it is gently raised therefrom and passed to a point of discharge by a conveyor mechanism, during which time excess matter such as dirt encrusted on the crops and the vines is separated therefrom by a novel shaker mechanism. The cleansed vines and crops are then further processed in accordance with common practice. Means are provided for adjusting the depth of the root cutter mechanism in accordance with the root characteristic of the plant or depth of the crops in the soil, depending upon the type of plant being harvested.

The present invention is advantageously employed in connection with the harvesting of peanuts and will be described in connection therewith for purposes of fully explaining the invention and its operation.

Referring now to the drawings, the apparatus of the invention is provided with a frame 10 including vertical supports 11 and longitudinal supports 12 suitably strengthened by supporting cross frame members where necessary. The frame 10 is provided with rear wheels 13 carried by an axle 14 suitably journalled in the frame, and front wheels 15 which may be carried by mechanism for adjusting the height of the front end of the apparatus, to be described. The frame 10 may be provided with a driver's seat 16, and a towbar connection 17 bolted at 18 to one of the cross frame members for purposes of towing the apparatus, it being understood that if desired, power means, not shown, may be mounted on the frame for operation and movement of the apparatus, as for example a gasoline motor.

As the harvester apparatus advances along a row of plants to be harvested, the stems and tops of the plants are guided into the front of the apparatus by means of two guide bars 19 forming extensions of the longitudinal frame members 12 and positioned on either side of the row. The guide bars 19 are sharply pointed and are provided with outwardly flared members 20 extending rearwardly to assist in separating and opening up any tangle of weeds and vines which may be present. As the vines pass between the guide bars 19, all vines which may extend beyond the normal width of a row of plants are severed by contact with two vertically disposed cutting blades 21 welded or otherwise secured to the guide bars 19, whereby only the central portions of the plants enter the harvesting mechanism of the invention.

Runners and other laterally extending vines either on or just below the surface of the soil are severed by cutter mechanisms shown as a knife edge 22 conveniently mounted on each of the forward wheels 15, which penetrate the soil to a depth necessary to accomplish this purpose. In certain instances, it may be more convenient to position the cutter mechanism 22 on the frame in the same general location but independently of the front wheels 15.

The plant tops, thus segregated and bunched by the cutting blades, pass into a pickup mechanism comprising two opposed endless belts 23 which converge inwardly upon each other in the form of a throat, joining under resilient pressure in back to back relationship to grasp the plant tops. As shown in Figure 7, each endless pickup belt 23 is carried upon a plurality of rollers 24 positioned between two longitudinal frame members 25 and 26 rigidly joined at intervals along their lengths by I members 27. The rollers 24 are rotatably mounted in pairs upon upper and lower slide bars 28 and 29 rigidly secured by a cross piece 30, the slide bars fitting between gibs 31 formed on the frame members 25 and 26 for reciprocation laterally thereof. A bar 32 runs parallel to the frame members 25 and 26, being rigidly secured thereto by pins 33. Each bar 32 is formed with a plurality of apertures 34 along its length, to receive slidably one end of pins 35 which are fixedly secured at the other end to the cross piece 30 of the slide bars 28 and 29. Each pin 35 carries a spring 36 seated upon the bar 32 and exerting a constant inward pressure on each pair of associated rollers 24, thus pressing each of the opposed pickup belts 23 inwardly of the respective opposed frame members 25 and 26. Thus, it will appear that the plants being harvested are grasped positively and secured under spring pressure between the pickup belts 23 as the plants pass through the throat formed by the converging portions of the two belts 23 at the front end of the apparatus, into the conveyor mechanism proper. Plants may be assisted into the throat zone of the two converging belts 23 by means of small arms or teeth 37 formed on the peripheries of the initial rollers 24.

As shown best in Figure 3, the pickup belts 23 are carried across successive rollers 24 onto main pulleys 38 journalled in the frame 10 across tensioning pulleys 39 onto guide pulleys 40′ and back over the rollers 24. It will be noted that the pickup belts 23 are so guided that the initial travel of the belts 23 is in a plane horizontal to the ground and at approximately the same elevation as the guide bars 19, whereby the selected portions of the plant vines and stems pass into the throat zone and are seized by the belts.

As pointed out heretofore, the pickup belts 23 may be driven by means of a power connection with the harvester wheels, to be described, or by a separate power source such as a gasoline engine, not shown. However, for best results, it is preferred that the lineal speed of operation of the belts 23 be exactly equal to the speed of forward movement of the harvester along the ground, so that the belts 23 will be approximately stationary with respect to the plants which are guided into it, at the time of contact. Thus, the plants are secured initially by the belts 23 under spring pressure, prior to vertical displacement of the plants in the ground.

As the peanut plants are secured by the pickup belts 23, the direction of travel of the belts 23 is modified from the horizontal plane upwardly, exerting a vertical or pulling force on the plants. Simultaneously, a horizontal cutting blade 38′ secured to the frame 10 passes beneath the peanut plants cutting off the tap root which is allowed to remain in the soil for fertilizing purposes. The plant with its associated peanut crop is then easily withdrawn from the ground by the belts 23 and passes up the inclined portion of the belts.

The invention further provides a novel mechanism for effecting separation of the plants from encrusted earth and other loosely associated debris, as the plants pass up and rearwardly on the inclined portion of the path of travel of the pickup belts 23. This is accomplished by means of two opposed shaker bars indicated generally at 40 and shown in detail in Figure 6, a shaker bar being located below and generally parallel to each inclined belt 23. Each shaker bar 40 comprises a frame 41 formed of steel rod joined by rigid cross bars 42, the frame being movable laterally and longitudinally with relation to the peanuts suspended from the pickup belts 23 as they are carried up the inclined path. Actuation of each shaker bar 40 is accomplished by a bell crank 43 rotatably journalled at 44 on the longitudinal supports 25 and 26, having an extension 45 on the lower end pivotally secured at 46 to a fixed arm 47 on the frame 41. One bell crank 43 is provided at each end of the frame 41, the two cranks being joined for simultaneous movement by a shaft 48 pivotally secured thereto at 49. A coil spring 50 is secured at either end to the frame member 26 and extends around an outer rod 51 of the frame 41, exerting a constant force drawing each of the opposed frames 41 inwardly toward each other. Once the shaker bars 40 are displaced outwardly by operation of the bell cranks 43 and released, the springs 50 have the effect of snapping the shaker bars 40 inwardly to strike the suspended masses of peanuts, roots and dirt sharply.

The mechanism for displacing the two shaker bars 40 outwardly includes an operating rod 52 for each shaker bar pivotally secured to the upper bell crank 43 at 49. Each operating rod 52 is actuated alternately to effect a slow outward displacement and sudden release of each of the shaker bars 40 operating each shaker bar intermittently several times during the interval required for a single plant to traverse the inclined pickup belt run 23.

The shaker rods 52 are operated by lost motion linkages including cam assemblies 53 secured to power shafts 54 which also carry the two main pulleys 39 supporting the upper reach of each of the pickup belts 23. Each cam assembly 53 includes a plate 55 keyed to the respective shaft 54 for rotation by a collar 56. The plate 55 carries a pin 57 caused to revolve at a fixed radius around the center of the plate 55. An arm 58 is pivotally secured at one end to the pin 57 and at the other end to the shaker rod 52 at 59. The plate 55 is further provided with a block pin 60 of such height as to catch the arm 58 as it pivots on the pin 57. As the plate 55 rotates, the pin 59 on the shaker rod 52 is caught by the block pin 60 and is revolved about the center of the cam assembly. As the center line of the arm 58 becomes parallel with the center line of the attached shaker rod 52, a dead center position is reached, and the maximum travel and outward displacement of the shaker bar 40 by means of the bell cranks 43 is accomplished. As the rotation of the plate 55 proceeds, the pivot point 59 is carried beyond the center line of the shaker rod 52, and the arm 58, which now rotates freely on the pin 57 in advance of the block pin 60, is advanced under the action of the springs 50 which snap the shaker bars 40 abruptly inwardly against the peanut plants. Thus, each arm 58 of the two cam mechanisms 53 provided, alternately moves approximately 180° in free travel to the position shown in Figure 10. Each cam assembly 53 is operated 180° out of phase with the associated cam assembly, whereby intermittent operation of the shaker bars is accomplished. Excessive overtravel of the arm 58 is prevented by a bumper mechanism 61 secured on the frame member 26; which the end of the arm 58 strikes after a full release stroke is completed. The bumpers 61 may be made of hard rubber or other similar material, and preferably may be eccentrically pivoted so that repeated blows of the arms 58 cause the bumpers 61 to rotate slowly, in order to equalize wear.

As shown, the right hand cam assembly 53 operates in clockwise direction and the left hand cam assembly operates in counterclockwise direction, in accordance with the direction of drive of the power shafts 54.

As the dirt free plants reach the top of the inclined portion of the belts 23, they pass through guides 62 which serve to position the plants as they are released by the belts 23. As best shown in Figure 5, a plant discharge mechanism is provided comprising a wheel 63 composed of fingers 64 of different lengths, designed to grasp the plants as they leave the pickup belts 23 and convey them to a collector 65 at the rear of the apparatus. The wheel 63 is carried on a shaft 66 journalled in housings 67 supported on arms 68 pivotally secured to the frame at 69 and having extending arms 70 joined by a cross bar 71. The bar 71 may be secured to the frame by a spring 72, providing a resilient mounting for the wheel 63, providing a flexibility desirable to eliminate the jamming of plants in the discharge mechanism. On one end, the shaft 66 is provided with a pulley 73 for power connection in a manner to be described.

A drive connection for operating the harvester is shown in Figure 4. A power takeoff pulley 74 is secured to the axle 14 and a driving belt connection provided over an idler pulley 75, a driven pulley 76 and a driven shaft 77 actuating a gear drive shown at 78. The gear drive 78 is provided with power takeoffs 79 driving the two power shafts 54 actuating the main pickup belt pulleys 39. The driven shaft 77 also carries a pulley 80 at the other end connected by a belt 81 with the wheel pulley 73 over two idler rollers 82, for purposes of driving the wheel 63.

The collector rake 65 receives cleansed plants from the wheel 63, and is supported on the harvester frame by a shaft 85 journalled in bars 83 and 84. The rake 65 may be dropped as shown to discharge a load of plants by manipulation of a hand brake 86 positioned conveniently by the operator and connected to the rake by a rod 87 and a conventional release linkage.

Referring to Figure 1, means are provided for lifting the front end of the harvester from the ground sufficiently to raise the tap root cutting blade 38' from penetrating the ground at the end of a row of peanut plants. To accomplish this, the front wheels 15 are carried upon shafts 88 received in housings 89 welded or otherwise secured to frame supports 90 and 91. A crank 92 having two arms 93 is rotatably journalled to the frame at 94, the extremities of the arms being secured with a ball and socket connection 95 to the wheel shafts 88. A brake pedal 96 and a hand brake 97 are provided to rock the crank 92, which is normally urged downwardly by two tension springs 98 each anchored at one end on the frame and on the other end to one of the arms 93. Depression of the foot pedal 96 forces the shafts 88 downwardly, complementing the force of the springs 98, to draw the framework of the harvester upwardly, withdrawing the horizontal cutting blade 38' from the ground. When it is desired to place the blade 38' in the ground, the operator draws back on the hand brake 97, lifting the arms 93 against the action of the springs 98 and drawing the wheel shafts 88 upwardly, whereby the front end of the harvester frame is dropped, lowering the knife into the ground. Once engaged in the earth, the knife 38' is so biased as to retain the harvester frame in lowered position and knife in the ground against the action of the springs 98, until the knife 38' is forcibly withdrawn again by depression of the foot pedal 96.

It will be observed that the present invention provides a markedly effective agricultural harvesting machine which is simple to construct and foolproof in operation. Matting of weeds and vines such as would clog the apparatus in use is effectively eliminated. Roots of plants being harvested which have valuable fertilizing properties are left in the ground without slowing the harvesting process, the roots also contributing to the elimination of soil erosion. The principles of the invention are particularly applicable for use in connection with the harvesting of peanut plants, and for this reason, the invention has been described in connection therewith. However, the invention is equally adaptable for use with the harvesting of other vegetables such as carrots, beets, turnips and the like, as well as leafy vegetables growing above the ground.

While the invention has been described with

I claim:

1. A plant harvesting apparatus comprising a wheeled frame having supporting front and rear wheels, for movement over a row of plants, guide members extending forwardly of the frame for separating laterally extending portions of the plants therefrom, vertical cutting blades above the guides for severing laterally extending vines and debris from the plants above the surface of the soil, vertical cutting mechanism on the front wheels of the frame penetrating the soil to cut lateral surface and subsurface vines and debris, pickup belts on the frame for receiving plants from the guides and withdrawing plants from the soil, and a horizontal unitary cutting blade on the frame comprising a fixed bar for insertion beneath the ground surface to cut plant roots at the moment of withdrawal by the pickup belts.

2. A plant harvesting apparatus comprising a frame having supporting front and rear wheels for movement over a row of plants, guide members extending forwardly of the frame and having outwardly flared members extending rearwardly for separating laterally extending portions of the plants therefrom, vertical cutting blades above the guides for severing laterally extending vines and debris from the plants above the surface of the soil, vertical cutting mechanism on the front wheels of the frame penetrating the soil to cut lateral surface and subsurface vines and debris, pickup belts on the frame for receiving plants from the guides and withdrawing plants from the soil, and a horizontal unitary cutting blade on the frame comprising a fixed bar for insertion beneath the ground surface to cut plant roots at the moment of withdrawal by the pickup belts.

3. A plant harvesting apparatus comprising a frame having supporting front and rear wheels for movement over a row of plants, guide members extending forwardly of the frame for separating laterally extending portions of the plants therefrom, vertical cutting blades above the guides for severing laterally extending vines and debris from the plants above the surface of the soil, vertical cutting mechanism on the front wheels of the frame penetrating the soil to cut lateral surface and subsurface vines and debris, pickup belts on the frame for receiving plants from the guides and withdrawing plants from the soil, and a horizontal unitary cutting blade on the frame comprising a fixed bar for insertion beneath the ground surface to cut plant roots at the moment of withdrawal by the pickup belts, said cutting mechanism being positioned intermediate the vertical cutting blades and the horizontal unitary cutting blade.

4. A plant harvesting apparatus comprising a frame having supporting front and rear wheels for movement over a row of plants, guide members extending forwardly of the frame for separating laterally extending portions of the plants therefrom, vertical cutting blades above the guides for severing laterally extending vines and debris from the plants above the surface of the soil, vertical cutting mechanism on the front wheels of the frame penetrating the soil to cut lateral surface and subsurface vines and debris, pickup belts on the frame for receiving plants from the guides and withdrawing plants from the soil, and a horizontal unitary cutting blade positioned below the frame and rearward of the vertical cutting blades comprising a fixed bar for insertion beneath the ground surface to cut plant roots at the moment of withdrawal by the pickup belts.

5. A plant harvesting apparatus comprising a frame having supporting front and rear wheels for movement over a row of plants, guide members extending forwardly of the frame for separating laterally extending portions of the plants therefrom, said guides converging inwardly from front to rear to form a throat, vertical cutting blades above the guides for severing laterally extending vines and debris from the plants above the surface of the soil, vertical cutting mechanism on the front wheels of the frame penetrating the soil to cut lateral surface and subsurface vines and debris, pickup belts on the frame for receiving plants from the throat of the guides and withdrawing plants from the soil, and a horizontal unitary cutting blade on the frame comprising a fixed bar for insertion beneath the ground surface to cut plant roots at the moment of withdrawal by the pickup belts, said cutter mechanism being positioned forward of the horizontal unitary cutting blade below said throat.

WILLIAM GREEN CROSS.

REFERENCES CITED

The following references are of record in the file of this patent:

UNITED STATES PATENTS

| Number | Name | Date |
|---|---|---|
| 776,174 | Dixon | Nov. 29, 1904 |
| 924,905 | Hollenbeck et al. | June 15, 1909 |
| 989,106 | Arbuthnot | Apr. 11, 1911 |
| 1,646,004 | Beckman | Oct. 18, 1927 |
| 1,883,666 | Flintjer | Oct. 18, 1932 |
| 2,247,293 | Flintjer | June 24, 1941 |
| 2,297,065 | McLendon | Sept. 29, 1942 |
| 2,468,276 | Sorenson | Apr. 16, 1949 |

FOREIGN PATENTS

| Number | Country | Date |
|---|---|---|
| 21,828 | Great Britain | 1906 |
| 118,073 | Australia | Feb. 10, 1944 |